United States Patent

Mino et al.

[11] 3,843,235
[45] Oct. 22, 1974

[54] IMAGE FORMING OPTICAL SYSTEM WHEREIN DEFOCUS IMAGES ARE IMPROVED

[75] Inventors: Masayuki Mino; Yukio Okano, both of Osaka, Japan

[73] Assignee: Minolta Camera Kabushiki Kaisha, Minami-ku, Osaka, Japan

[22] Filed: Oct. 24, 1972

[21] Appl. No.: 299,802

Related U.S. Application Data

[63] Continuation of Ser. No. 143,269, May 13, 1971, abandoned, which is a continuation of Ser. No. 855,290, Sept. 4, 1969, abandoned.

[30] Foreign Application Priority Data

Sept. 14, 1968 Japan.............................. 43-66302
Dec. 29, 1968 Japan.............................. 44-768
Jan. 28, 1969 Japan.............................. 44-6538

[52] U.S. Cl................................ 350/205, 350/314
[51] Int. Cl......................................... G02b 5/22
[58] Field of Search................ 350/197, 205, 314

[56] References Cited
UNITED STATES PATENTS

| | | | |
|---|---|---|---|
| 1,332,410 | 3/1920 | Potts | 350/314 X |
| 1,469,931 | 10/1923 | Davison | 350/205 |
| 2,101,016 | 12/1937 | Beach | 350/197 X |
| 2,959,105 | 11/1960 | Sayanagi | 350/314 X |
| 3,045,530 | 7/1962 | Tsujiuchi | 350/314 UX |
| 3,090,281 | 5/1963 | Marechal et al. | 350/314 X |
| 3,397,023 | 8/1968 | Land | 350/205 X |
| 3,476,457 | 11/1969 | Nomarski | 350/205 |

FOREIGN PATENTS OR APPLICATIONS

982,520  2/1965  Great Britain..................... 350/205

*Primary Examiner*—John K. Corbin
*Attorney, Agent, or Firm*—Watson, Cole, Grindle & Watson

[57] ABSTRACT

An optical system, such as that used in photographic cameras and microscopes, which forms images of objects, having an optical element of appropriate transmission characteristics for obtaining suitable out-of-focus (defocused) images.

10 Claims, 12 Drawing Figures

FIG. 5
FIG. 6
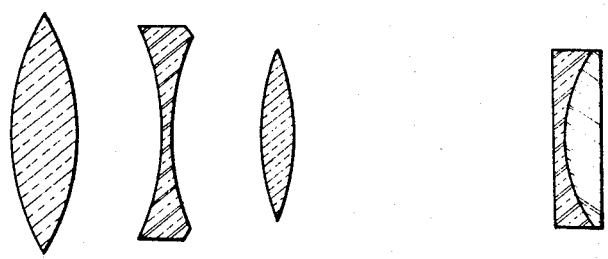
FIG. 7
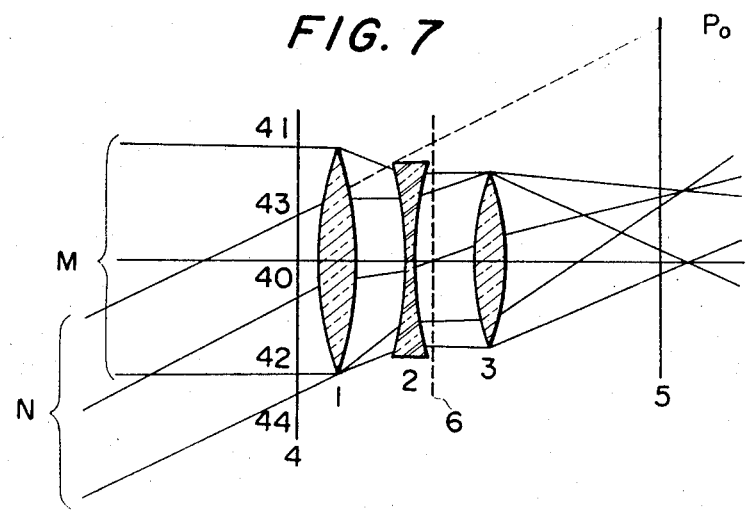
FIG. 8
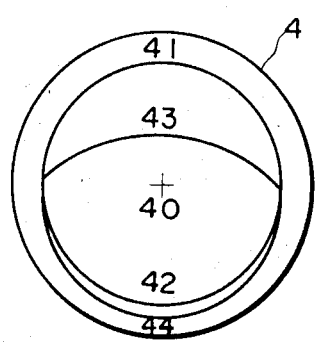
FIG. 9
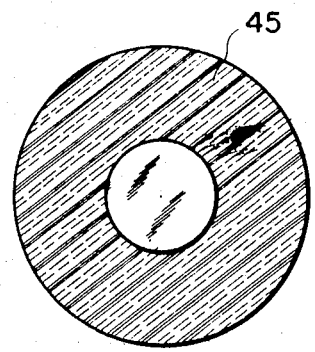

FIG. 10
FIG. 11
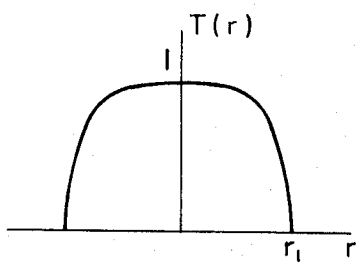
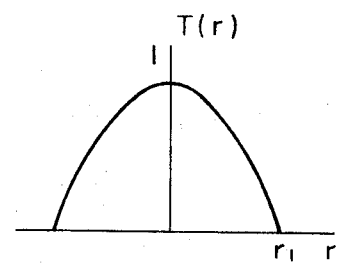
FIG. 12
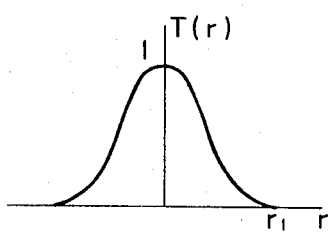

IMAGE FORMING OPTICAL SYSTEM WHEREIN DEFOCUS IMAGES ARE IMPROVED

The present application is a continuation of application Ser. No. 143,269, filed May 13, 1971, which is a continuation of application Ser. No. 855,290, filed Sept. 4, 1969 both now abandoned.

BACKGROUND OF THE INVENTION

The present invention relates to an image forming optical system, and more particularly to such a system having appropriate characteristics for obtaining suitable out-of-focus images.

In the photographic camera art, images of objects not in the plane of best focus may be recorded as blurred on the film, such images being known as out-of-focus or defocused images. Also, in most cameras, an image of a point source not in the best focus plane becomes a disk or circular patch of uniform illumination, namely, a circle of confusion, the defocused image being a mass of circles of confusion. Obviously, such a defocused image often produces an imperfect photograph.

In the past, methods have been devised for avoiding the imperfect defocused image by means of selecting a proper lens surface curvature, or by providing a specially ground portion for the lens surface, or by determining the distances between lens components which may be different from optimum values for in-focus images. With these methods, however, defocused images may be improved for those objects in the proper range, for example in front of the best focused object, but it is impossible to improve all the defocused images. Furthermore, the defocused images of objects in other than the proper range are more difficult to improve so that the best focused image may even be disturbed.

SUMMARY OF THE INVENTION

The primary object of the present invention is to provide an optical system by means of which suitable defocused images for all objects may be obtained even though they may not be in best focus plane, without disturbing the best focused images.

Another object of the present invention is to provide such an optical system by means of which suitable defocused images may be obtained not only for beams parallel with the optical axis but also for beams oblique thereto.

Other objects and a fuller understanding of the present invention may be had by referring to the following description of the preferred embodiments taken in conjunction with the accompanying drawings.

BRIEF DESCRIPTION OF THE DRAWINGS

FIG. 5 is a cross section view of an embodiment of the optical system in accordance with the present invention.

FIG. 6 is a cross section view of another embodiment of the optical system in accordance with the present invention.

FIG. 7 is a side view of an embodiment in combination with a filter in accordance with the present invention and a conventional optical system.

FIG. 8 is a front view of the embodiment shown in FIG. 7.

FIG. 9 is a front view of an embodiment of a filter in accordance with the present invention.

FIG. 10 is a graph showing another example of an optical system in accordance with the present invention.

FIG. 11 is a graph showing the third example of an optical system in accordance with the present invention.

FIG. 12 is a graph showing the fourth example of an optical system in accordance with the present invention.

DETAILED DESCRIPTION OF THE PRESENT INVENTION

Figure 3:
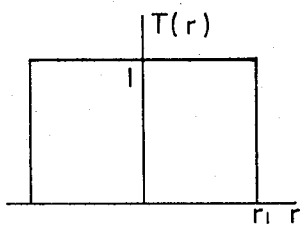
FIG. 3 is a graph showing an example of the local variation of the transmission factor of the aperture of a conventional optical system.

The image forming optical system, such as a photographic lens system, is in general a compound lens system of which its aperture is of circular shape or the like determined by an aperture stop provided in the system, the transparency through the aperture being uniform as illustrated in FIG. 3.

Figure 1:
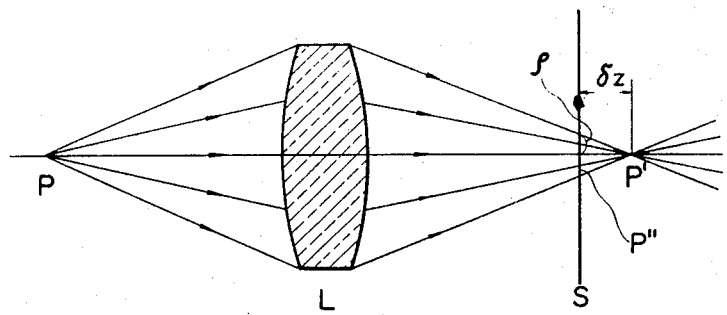
FIG. 1 show a defocused image produced by a conventional optical system.

In FIG. 1, assuming that an aperture of a lens system L is of circular shape, and that the lens system L has no vignetting and is free from aberration, rays from point source P form a disk of uniform illumination, namely, a circle of confusion, on a plane S which is disposed at a distance $\delta Z$ from the conjugate point P' perpendicularly to the optical axis. Since an object is considered to be a collection of point sources, an image of the object on plane S through lens system L, namely, a defocused image, is a mass of circles of confusion, and the imaging property of the lens system for the defocused image is shown as a curve ($a$) in FIG. 2 which represents an optical transfer function in relation to spatial frequency. The curve ($a$) shows that the optical transfer function of the conventional lens system for the defocused image has negative value in a certain range of spatial frequency, which shows an inversion of the image. Moreover, the curve ($a$) shows that there is large difference between the optical transfer function in the spatial frequency $S_1$ as compared to that in the spatial frequency $S_2$. This shows that a defocus image of an object through the lens system L is not clear and that the image is unsuitable to produce a good photograph. This is chiefly due to the reason that the transparency $T(r)$ (see FIG. 3) is uniform in the aperture of the conventional lens system which indicates a transparency distribution of the aperture in a radial direction.

Figure 4:
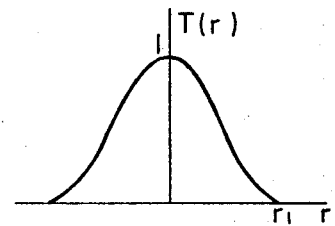
FIG. 4 is a graph showing an example of the local variation of the transmission factor of the aperture of an optical system in accordance with the present invention.

On the other hand, if the transparency distribution of the aperture is made as having the property of decreasing exponentially from center toward the circumference and as being symmetric with the center as shown in FIG. 4, it can be expected that the distribution of illuminance in the circle of confusion may have a similar property to that of the transparency distribution. In this case, a defocused image of a point source is not a circle of confusion with uniform illuminance but of illuminance which is maximum at the center and decreases in proportion of the distance from the center. The image forming property for such an image with a circle of confusion with the non-uniform illuminance is shown as a curve (b) in FIG. 2 when the transparency distribution of the aperture is shown by a formula as follows:

$$T(r) = (1 - r^2)^2$$

in which T(r) is the transparency and r is the distance in the radial direction.

Figure 2:
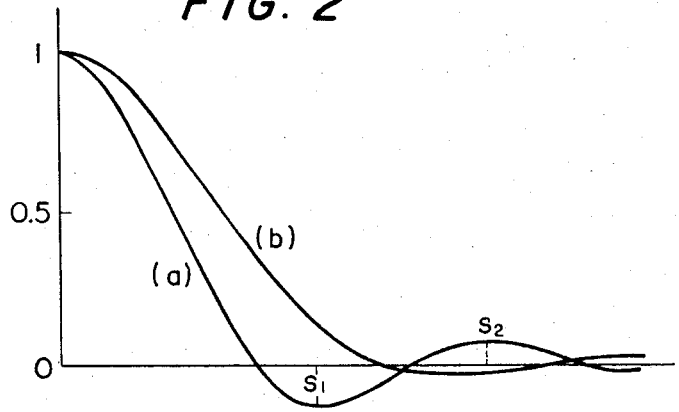
FIG. 2 is a diagram showing response functions of a conventional optical system and an optical system in accordance with the present invention.

The should be noted that curves (a) and (b) of FIG. 2 were arrived at under similar conditions regarding the diameter of the aperture and the focal length of the lens system, and the distance $\delta Z$.

The highly favorable condition of the image as defocused in accordance with the present invention is expressed as follows from the standpoint of the optical transfer function:

1. The optical transfer function is a monotonously decreasing function in accordance with an increase in spatial frequency.
2. The optical transfer function does not become negative.

Again, according to FIG. 2, the negative value of the optical transfer function in the curve (b) is small, which means that the response characteristics represented by the curve (b) fulfill the requirements (1) and (2) and can satisfy the aims of the present invention.

On the basis of those facts, the present invention provides an optical system having an optical element with such light absorbing properties that the transparency distribution in the optical system will be as mentioned above. In this manner, it is possible to obtain a highly favorable condition of a defocus image.

In these cases it can be understood from FIG. 1 that if the distance $\delta Z$ is increased or decreased, only the radius $\rho$ of the circle of confusion changes without the distribution of illuminance. Consequently, as can be seen by curves (a) and (b) in FIG. 2, which represent the response characteristics for the defocused image, the form of curves (a) and (b) and the relation between them do not change in spite of change of the distance $\delta Z$ since they only extend or contract in the direction of the lateral axis with such change.

Therefore, the present invention is able to provide favorable defocused images of objects existing in various distances from the best focus plane.

The curve (b) in FIG. 2 has a higher value than the curve (a) in the low frequency range until the curve (b) meets the abscissa, which indicates that the defocused image according to the present invention is less fuzzy than that of the conventional lens system.

However, for the purpose of the present invention, the property of transparency distribution need not be limited within the form as shown in FIG. 4. Various forms as shown in FIGS. 10 to 12 are available which depict responses to the desired state of various defocused images insofar as they are symmetric about the center with the transparency decreasing with an increase in distance in the radial direction.

Then as for achieving this absorbing property, such means are cited as follows:

$A_1$. Adhering photo-absortive material to the surface of a plane-parallel transparent plate or a lens in the optical system by means of vacuum evaporation, said plate being used as a density filter, $A_2$. Coating photosensitive material over the surface of the plate or the lens and exposing the material to light having an intensity so varied with a portion of the surface on which the light impinges that the degree of blackening of the material may be made variable with such portion.

Accordingly, it is possible to obtain various desirable properties of transparency distribution, although they may not be suited for manufacturing production. Then, if such properties are allowable for the transparency distribution is as follows:

$T(r) \approx \exp(\alpha r^2)$ $T(r)$: transparency $\alpha$ : constant with a negative value $r$ : distance from the center The property can be achieved by disposing an optical concave lens in the optical system with the proper degree of absorption which is uniform throughout the material. Such may be made readily available for manufacturing.

FIG. 5 shows a triplet type lens system as one embodiment in which the concave lens is made of the optical material as mentioned above.

FIG. 6 shows a density filter consisted of a planoconcave lens and a planoconvex lens cemented to one another along their curved surface to produce a doublet lens.

It should be noted that the lens and the filter which has the proper transparency distribution as mentioned above are generally called "optical elements" hereinafter.

FIG. 7 shows the location element of a filter as the optical element disposed in a triplet lens system in which 1 is a first biconvex lens, 2 is a biconcave lens, 3 is a biconvex lens, and 5 designates an image plane. Various setting positions are available for the filter such as in front, intermediate and to the rear of the lens system. When the filter is disposed in front of the lens system as shown at 4 in FIG. 7, the first biconvex lens 1 serves as a pupil for the triplet lens for light beams M parallel with the optical axis so that light beams limited by reference numerals 41 to 42 through filter 4 are transmitted through the triplet lens to the image plane 5. On the other hand, for light beams N impinging obliquely to the lens system, there is a vignetting effect produced by the second biconvex lens 3, although the light beams which transmit the triplet lens system between 43 and 44 can reach the image plane 5. In other words, in FIG. 8 which shows the filter 4 seen from the left in FIG. 7, the light beams M through the lens system are limited by the circular arc between 41 and 42 and the light beams N through the lens system are limited by the arc from 43 to 44. Since the distribution of illuminance in the circle of confusion and the form of the circle are similar to those of transparency in a portion of the filter through which light rays for forming the circle of confusion passes, the circle of confusion formed by said oblique light beam N is distorted and the distribution of illumination in the circle is not symmetric. Consequently, defocused images are disturbed. For avoiding these drawbacks and fully achieving an improvement of the defocused image according to the present invention, means are employed so as to restrict the area in the filter through which light beams may pass, namely, the aperture of the filter. In other words, the transmission distribution must be given within the pupil of the optical system and the optical element must be in the pupil. Such means comprises a light limiting member as shown by 45 in FIG. 9 consisting of an aperture in an opaque body and which is disposed closely to the filter. Here, the radius of said aperture should be less than the distance 40 to 43 in the filter so that vignetting may not occur for the light beam to be most oblique that can be focused on the area within a given frame on the image plane with its outermost ray passing through point 43. (The outermost ray is defined as a ray incident to the first surface of the system heading for outermost point $P_o$ on image plane 5 for the light beams N.) Accordingly, a favorable circle of confusion can be achieved with rotational symmetric distribution of illuminance, with the quantity of light reaching the image plane being reduced by the limiting member 45.

When the filter 4 is disposed within the system at a location shown by dotted line 6 in FIG. 7, i.e., through the point where the principal ray of oblique light beam N crosses the optical axis, vignetting does not occur even for the oblique light beam without said light limiting member. In this case, if the diameter of the filter is equal to the pupil of the system, the most quantity of light led to the lens system will be able to reach the image plane.

As for a lens system of a photographic camera, a diaphragm for controlling light incident to a film is used and is disposed as an optical stop, for example, in the position as mentioned above. Consequently, if the optical element is adopted for such a lens system of the photographic camera, the optical element and the diaphragm should be disposed closely to one another. However, in this case, the feature of transparency distribution on the optical element changes in response to diaphragm aperture. Therefore, when it is desired that the light incident to the film is controlled without disturbing the feature of the transparency distribution, a neutral density filter or a pair of polarizing filters may be used instead of the diaphragm. Otherwise, a plurality of optical elements which are different in sizes of their effective apertures but are similar in each property of transparency distribution may be prepared for the lens system, and light controlling is carried out by selecting a suitable one from them.

Furthermore, it is also possible to adopt such a means for light controlling so as to exchange optical elements wherein every one of which has different property of transparent distribution from another as shown, for example, in FIGS. 10 to 12 respectively. It is also possible for the light control to adopt a plurality of the above-mentioned means by combining it.

It should be noted that the invention has been described mainly for the triplet type lens system although the application of the invention need not be limited to such a specific lens type. It is therefore possible to apply the invention to various types of lens systems such as the Gauss type, the telephoto type and so on for improvement of the property for the defocused image.

According to the present invention, since the original features of objects are retained in the defocused images without unreasonable modification, it is possible to ascertain the outline of original features from the defocused images which are converged in front of or behind the image plane. Accordingly, the present invention is available not only for a photographic lens system but also for a microscope objective lens, a lens system of a projector, and the like, for observation and/or measurement of optical images.

We claim:

1. An image forming optical system comprising: an image plane; a light converging means including compound lenses for forming a real image of an object on said image plane; and an optical element having a light absorbing means for affording such property of transmission distribution to the optical element as the transmission monotonously decreases with an increase of distance in the radial direction in the optical member and the characteristic curve of the distribution is symmetric relative to the center of said optical element, said optical element being disposed perpendicularly to an optical axis of said light converging means with the center of the element being matched with said optical axis of said light converging means so that the optical element provides an aperture of said light converging means with the transmission distribution and said optical element being disposed at a position at which a principle ray of an oblique light beam capable of reaching the image plane crosses the optical axis whereby suitable defocused images may be obtained for beams both parallel and oblique to the optical axis.

2. An image forming optical system as set forth in claim 1, wherein said optical element comprises a biconcave lens of light-absorbing material, the absorption being uniform throughout the material.

3. An image forming optical system as set forth in claim 2, wherein said light converging means includes an aperture stop disposed therein, said optical element being disposed adjacent the stop.

4. An image forming optical system as set forth in claim 1, wherein said optical member comprises a planoconvex lens and a planoconcave lens cemented to each other along their curved surfaces, said planoconcave lens being made of light-absorbing optical material, the absorption being uniform throughout the material, and said planoconvex lens being made of transparent optical material.

5. An image forming optical system as set forth in claim 4, wherein said light converging means includes a aperture stop disposed therein, said optical element being disposed adjacent the stop.

6. An image forming optical system as set forth in claim 1, wherein said optical element comprises a transparent plate coated with light-absorbing material made from light-sensitive material.

7. An image forming optical system as set forth in claim 1, wherein said optical element comprises a plane parallel transparent plate coated with light-absorbing material by means of vacuum evaporation.

8. An image forming optical system as set forth in claim 1, wherein said optical system is disposed in front of the light converging means and is covered with an aperture-restricting member having an aperture with a radius which is less than a distance from said optical axis of the light-converging means to a point through which an outermost ray of an oblique light beam passes.

9. An image forming optical system as set forth in claim 1, wherein said optical element is disposed at a position in the light-converging means and an aperture-restricting means is provided for restricting the aperture of the optical member to the radius which is less than a distance from the optical axis of the light-converging means to a point through which an outermost ray of an oblique light beam passes.

10. An image forming optical system as set forth in claim 1, wherein said light converging means includes an aperture stop disposed therein, said optical element being disposed adjacent the stop.

* * * * *